United States Patent

Hane et al.

[11] Patent Number: 5,814,409
[45] Date of Patent: Sep. 29, 1998

[54] EXPANDED FLUORINE TYPE RESIN PRODUCTS AND A PREPARATION PROCESS THEREOF

[75] Inventors: Toshioki Hane; Hisao Koike, both of Suzuka, Japan

[73] Assignee: Asahi Kasei Kogyo Kabushiki Kaisha, Osaka, Japan

[21] Appl. No.: 921,528

[22] Filed: Sep. 2, 1997

Related U.S. Application Data

[63] Continuation of Ser. No. 578,694, filed as PCT/JP94/01886, Nov. 9, 1994, abandoned.

[30] Foreign Application Priority Data

May 10, 1994 [JP] Japan ..................... 6-096279

[51] Int. Cl.⁶ .................................................. B32B 27/00
[52] U.S. Cl. ....................... 428/421; 428/218; 428/314.4
[58] Field of Search ............................. 428/218, 314.4, 428/421

[56] References Cited

U.S. PATENT DOCUMENTS

| | | | |
|---|---|---|---|
| 4,560,829 | 12/1985 | Reed et al. .......................... | 174/102 R |
| 4,615,850 | 10/1986 | Pecsok .................... | 264/45.9 |
| 4,737,526 | 4/1988 | Mukaiyama et al. ................... | 521/145 |
| 4,842,678 | 6/1989 | Noro et al. .............. | 156/636 |
| 4,954,141 | 9/1990 | Takiyama et al. ........................ | 51/296 |

FOREIGN PATENT DOCUMENTS

| | | |
|---|---|---|
| 62-50340 | 3/1987 | Japan . |
| 62-280236 | 12/1987 | Japan . |
| 4-31446 | 2/1992 | Japan . |
| 5-239249 | 9/1993 | Japan . |

OTHER PUBLICATIONS

Kumar, Cell Poly, vol. 12, No. 3, pp. 207–223 (1993).

*Primary Examiner*—Helen L. Pezzuto
*Attorney, Agent, or Firm*—Birch, Stewart, Kolasch & Birch, LLP

[57] ABSTRACT

The present invention relates to an expanded product comprising a thermoplastic fluroine type resin which does not have a cross-linking structure and has an expansion ratio of between 4-fold and 30-fold and a closed cell percentage of 40% or more. The expanded product contains at least one interface comprising layers having different cell densities and has a distribution index (Sc) and a coefficient of variation (Cv) of the maximum diameter of an open cell present at an optional cross section of each layer of $0<Sc\leq 6$ and $0<Cv\leq 1$, respectively, which are represented by the following equations:

$$Sc=(L_{Max.}-L_{Min.})/L_{av.} \quad (1)$$

$$Cv=SD/L_{av.} \quad (2)$$

wherein $L_{Max.}$, $L_{Min.}$ and $L_{av.}$ represent maximum, minimum and average values of maximum diameters of open cells, respectively; and SD represents a standard deviation. The expanded product can be used as a polishing cloth for electronic materials and causes no dullness of edges, exhibits stable polishing performance for a long time, and has excellent mechanical strength such as tear strength and compressive strength, constant dielectric constant before and after compression of the expanded product, and an excellent voltage resistance.

18 Claims, 1 Drawing Sheet

# 5,814,409

EXPANDED FLUORINE TYPE RESIN PRODUCTS AND A PREPARATION PROCESS THEREOF

This application is a continuation, of application Ser. No. 08/578,694, filed as PCT/JP94/01886, Nov. 9, 1994, now abandoned.

TECHNICAL FIELD

The present invention relates to a multilayer expanded product comprising a thermoplastic fluorine type resin which does not have a cross-linking structure and has a specific expansion ratio, a specific closed cell percentage and a specific cellular structure, and to a process for preparing the same.

BACKGROUND ART

Conventionally, there have been proposed expanded fluorine type resin products which have both excellent properties of fluorine resins such as heat resistance, solvent resistance, weatherability, electrical insulating properties and flame retardance and properties of an expanded product such as a light weight, cushioning properties, low dielectric constant and thermal insulating properties. These expanded fluorine type resin products have been applied to various uses such as an electrical insulator, a polishing cloth for electrical materials and a thermal insulating sheet.

U.S. Pat. Nos. 4,560,829 and 4,615,850 disclose expanded fluorine type resin products for electrical insulators. Both of the expanded products have an expansion ratio of around 4-fold, a high degree of hardness and poor flexibility. Some expanded products do not have a sufficiently lowered dielectric constant. Japanese Patent Application Laid-Open Nos. 50340/1987 and 31446/1992 disclose expanded products having a high expansion ratio although there is no description about the degree of hardness. The disclosed expanded products have a wide distribution of cell diameters because each cell has a large diameter with the result that their surfaces are not smooth enough. U.S. Pat. No. 4,737,526 and Japanese Patent Application Laid-Open No. 280236/1987 disclose expanded products having a cross-linking structure, a high expansion ratio and small cell diameters. The expanded products cannot be recycled since the resins used are cross-linked in order to impart adequate expansion to the products. The preparation process for these products is applied only to cross-linkable resins. The process is complicated and has problems such that an acidic gas is generated during the cross-linking treatment. Japanese Patent Application Laid-Open No. 239249/1993 discloses an expanded product comprising fine cells and having a high expansion ratio, which is obtained by using a blowing agent having a high boiling point. However, the blowing agent is condensed in the cells of the expanded product by cooling after expansion and this causes a decrease in the internal pressure of the cells because of the high boiling point of the blowing agent used so that the surface smoothness of the product is poor. In addition, the expanded product easily undergoes dimensional changes when the product is used, particularly in the form of a sheet and a tape.

U.S. Pat. No. 4,842,678 discloses a polishing cloth comprising an expanded fluorine type resin product having an expansion ratio of 1.5 to 30-fold and an average cell diameter of 300 pm or less and containing 0 to 70% of unexpanded resin phases. U.S. Pat. No. 4,954,141 discloses a polishing pad for a semiconductor wafer mirror surface made of an expanded fluorine type resin product.

The above-mentioned expanded fluorine type resin products are developed by focusing mainly on the uniformity of expanded products having a single cellular structure. In general, dynamic properties, electrical properties and thermal properties of an expanded product often relate to the cell diameter. Compression modulus and heat conductivity are proportional to the cell diameter. Tear strength and dielectric breakdown voltage are inversely proportional to the cell diameter. When an expanded fluorine type resin product is used for an electrical insulator, a more uniform and finer cell diameter is preferred in order to increase the dielectric breakdown voltage. However, the compression modulus is decreased with a minimized cell diameter. Namely, it is difficult for an expanded product to have inconsistent properties at the same time.

All of the expanded fluorine type resin products forming the above polishing cloth have a single cellular structure. Although the expanded products have excellent chemical resistance and provide a smooth surface to the substance to be polished, they suffer from lack of reliability in maintaining constant polishing performance for a long time. Therefore, with long term polishing, it is necessary that the surface of a polishing cloth be subjected to a truing treatment (a treatment to obtain a polishing cloth having high flatness by polishing the surface of the pad with a hard substance to modify or true the rough surface), and that the polishing conditions be changed. Since these polishing clothes are relatively soft, they do not easily cause processing defects such as scratches (linear marks on the polished surface) at an earlier stage of the polishing. However, the polishing cloths easily cause dullness of the edges of wafers and decrease the yield of semiconductors being produced. Generally, the dullness of edges is prevented by using hard materials having small elastic deformation, and the processing defects are prevented by using soft materials having large elastic deformation. It is difficult for the polishing cloths having a single structure to possess the above inconsistent properties at the same time. When polishing, a slightly visible uniformity of the pressure which is applied to the polishing cloths is extremely important in order to attain a smooth surface of the substance to be polished. Accordingly, there has been a demand for a polishing cloth having both a uniform distribution of cells in the direction of the surface of the cloth and unevenness in hardness in the direction of thickness of the cloth.

As described above, it is difficult for the conventional expanded fluorine type resin products with a single cellular structure to possess the above-mentioned various physical properties at the same time.

*Cell Poly*, vol. 12, no. 3, page 207 (1993) discloses a polycarbonate as an expanded fluorine type resin product having a multilayer cellular structure. Japanese Patent Publication No. 57704/1992 suggests an expanded fluorine type resin product having a multilayer cellular structure. However, the expanded products obtained according to the processes disclosed in the above prior art have large cell diameters and low cell densities, and the distribution of the cell diameters is not sufficiently uniform.

Usually, the melt viscoelasticity of crystalline resins such as a fluorine type resin depends highly on the temperature. It is often difficult to control the temperature to obtain a resin having adequate expansion and suitable melt viscoelasticity. Therefore, it has been considered that the production of an expanded fluorine type resin product, which does not have a cross-linking structure but has a high cell density, is substantially difficult. In particular, it is considered that physical blowing agents are not easily dissolved or dispersed in a perfluoro resin and that it is difficult to maintain a sufficient amount necessary for functioning as a blowing agent in the resin because of the extremely excellent solvent resistance of the perfluoro resin. Further, the perfluoro resin normally has a melting point higher than 250° C. so that blowing agents are evaporated while the resin is softened to achieve a melt viscoelasticity suitable for expansion. As explained above, there has not been proposed a process for preparing an expanded fluorine type resin product having a specific expansion ratio, a specific closed cell percentage, a multilayer cellular structure and a uniform dispersion of cell diameters in each layer.

The present invention aims at avoiding the problems which the conventional expanded fluorine type resin products possess to provide an expanded fluorine type resin product having a novel structure and being applicable to various uses and to provide a process for preparing such an expanded fluorine type resin product. Namely, a purpose of the present invention is to provide an expanded fluorine resin type product which exhibits constant polishing performance for long term polishing without dullness of edges when used for a polishing cloth; which prevents the dielectric constant and voltage resistance from changing due to the external pressure when used for an electrical insulator; and which is capable of balancing the compression modulus and the tear strength when used for a thermal insulating sheet. The other purpose of the present invention is to provide a process for preparing the same.

DISCLOSURE OF THE INVENTION

The present invention relates to an expanded product comprising a thermoplastic fluorine type resin which does not have a cross-linking structure and has an expansion ratio of between 4-fold and 30-fold and a closed cell percentage of 40% or more, the expanded product which contains at least one interface comprising layers having different cell densities and which has a distribution index (Sc) and a coefficient of variation (Cv) of the maximum diameter of an open cell present at an optional cut surface of each layer of $0<Sc \leq 6$ and $0<Cv \leq 1$, respectively, which are represented by equations as follows:

$$Sc=(L_{Max.}-L_{Min.})/L_{av.} \quad (1)$$

$$Cv=SD/L_{av.} \quad (2)$$

(wherein $L_{max.}$, $L_{Min.}$ and $L_{av.}$ represent maximum, minimum and average values of maximum diameters of open cells, respectively; and SD represents a standard deviation).

The expansion ratio of the expanded product of the present invention is between 4-fold and 30-fold based on the whole expanded product. The expansion ratio relates to various properties of the expanded product such as dynamic properties, electrical properties and thermal properties, and it is appropriately selected so as to exhibit the most suitable properties for the use of the expanded product. For use as a polishing cloth, an expansion ratio satisfying a suitable degree of hardness and compression modulus is selected. In use for an electrical insulator, an expansion ratio satisfying a low dielectric constant and appropriate dynamic properties is selected. When the expansion ratio is less than 4-fold, the degree of hardness of the expanded product is so high for the use as a polishing cloth that the surface of the substance to be polished is easily scratched due to the difficulty in elastic deformation of the resultant expanded product, and the dielectric constants of some fluorine type resins to be used are not reduced to the level sufficient for the use as an electrical insulator. When the expansion ratio exceeds 30-fold, the elastic deformation becomes too large due to a degree of hardness which is too low so that the smoothness of the surface of the substance to be used is lowered and the dynamic properties and closed cell percentage are also reduced. The preferable expansion ratio is between 6-fold and 25-fold.

The closed cell percentage of the present expanded product is 40% or more, preferably 50% or more, and more preferably 60% or more. The closed cell percentage greatly influences the dynamic properties of the expanded product, particularly the degree of hardness and compression properties such as compression strength, compression modulus and the recovery rate of compression modulus. For the use as a polishing cloth, it is considered that the closed cell percentage has a great influence in cushioning the polishing pressure inside the expanded product. When the closed cell percentage is less than 40%, the smoothness of the surface of the substance to be polished is likely to be lowered. When the closed cell percentage exceeds 40%, the apparent density and thickness are hardly changed by a compressive external force and the dielectric constant and voltage resistance are also hardly changed.

The expanded product of the present invention contains at least one interface comprising layers having different cell densities. In other words, the expanded product is constituted with a multilayer structure having two or more layers having different cell densities. The cell density refers to the number of cells per unit volume in each layer. The layers having different cell densities refer to layers adjacent to each other having a ratio of cell densities of between 5 and $10^5$. The ratio of cell density is preferably between 10 and $10^4$. When the ratio is less than 5, a substantially homogeneous cellular structure is obtained. When the expanded product is used for a polishing cloth, it cannot succeed both in avoiding dullness of an edge and in preventing the occurrence of scratches or the like at the same time. When the expanded product is used for an electrical insulator, the voltage resistance to the external compressive force is apt to be decreased. When the ratio exceeds $10^5$, the walls of cells in layers having a high cell density becomes disadvantageously thin so that the cells are easily broken and the closed cell percentage cannot be maintained.

The number of the layers in the expanded product of the present invention is not particularly limited, but is generally from 2 to 7. The resultant expanded products are sliced in parallel with each layer to obtain an expanded product having the desired number of layers. For instance, an expanded product comprising a three-layer structure such as A/B/A layers is sliced at the layer B to obtain an expanded product comprising two layers. The thickness of one layer is 1 to 90% of the total thickness of the expanded product. The position of an interface of each layer changes depending on the proportion of the thickness of each layer to the total thickness of the expanded product.

The cell density of each layer is preferably $10^6$ per cm$^3$, more preferably $10^7$ per cm$^3$. When the cell density is high, the distribution index and coefficient of variation described below are easily adjusted within specified ranges, and the existence ratio of open cells to closed cells present on the surface of the expanded product is preferably stabilized for the time being. The open cell herein refers to a cell exposed on the surface of the expanded product and whose wall is cut. The closed cell refers to a cell exposed on the surface of the expanded product and whose wall is not cut.

When the expanded product is used for a polishing cloth, the surface accuracy of the substance to be polished is preferably improved by the high cell density. A polishing cloth having a high cell density can touch a finely rugged surface of the substance to be polished with a uniform pressure. Conceptionally, the closed cells receive a polishing pressure with their cell walls, and the open cells receive the pressure with their cut surfaces of the cell walls. It is presumed that the proportion of cut surface is increased by making the cell density high so that the pressure can be uniformly distributed. Further, it is considered that an important point for stability of polishing performance is that the existence ratio of the open cells on the polishing surface renewed with the progress of polishing hardly changes as described below. When the cell density is high, the existence ratio of open cells on the surface of the polishing cloth is high and that of closed cells is low. In the case of the use as an electrical insulator, the cells become large when the cell density is low. As a result, the surface smoothness is lowered and the thickness of an insulating tape cannot be reduced. Further, dynamic properties in a tape, i.e., reduction of tear strength, are deteriorated. Therefore, a higher cell density is preferred.

The distribution index (Sc) and the coefficient of variation (Cv) of the maximum diameter of an open cell present at an optional cut surface of each layer of the present expanded product must be $0<Sc\leq6$ and $0<Cv\leq1$. The maximum diameter of an open cell refers to the longest length of the area planarly closed with a cell membrane.

When the distribution index and the coefficient of variation exceed 6 and 1, respectively, the uniformity of diameters of open cells is damaged to cause a decrease in the surface accuracy of a substance to be polished and a reduction in the polishing performance during long term polishing in case of the use as a polishing cloth. In order to maintain the polishing performance constant for a long time, the distribution index is preferably 5.5 or less, more preferably 5 or less, and the coefficient of variation is preferably 0.95 or less, more preferably 0.90 or less. It is more preferable that the values of the distribution index and the coefficient of variation are smaller.

The cut surface of the expanded product includes sections of cells cut at various positions. Even if the sizes of cells are the same, the sizes of the open cells exposed on the cut surface of the expanded product are not always the same. Accordingly, the sizes of the open cells need to be fine and uniform to obtain open cells which are as uniform as possible.

The expanded product of the present invention is made into a sheet having a certain thickness for the use as a polishing cloth. On the surface of the sheet, open cells and closed cells coexist at a certain proportion. The states of a polishing liquid maintained in the open cells and abrasion refuse of the polishing cloth generated according to the progress of polishing, both of which are present at the interface between the polishing cloth and the substance to be polished, are changed along with a change of the existence ratio of the open and closed cells to probably influence the polishing rate and the surface accuracy of the substance to be polished. The fluorine type resin expanded product of the present invention has uniform open cells as described above. Therefore, when the present expanded product is used for a polishing cloth, the interface between the polishing cloth and the substance to be polished is stable during polishing and the existence ratio of the open and closed cells on the whole surface of the substance substantially hardly changes with each polish. From the standpoint of stability, higher cell densities are most preferred.

The expanded product of the present invention desirably has a Taber-volume loss of between 25 mm³ and 240 mm³. The Taber-volume loss is considered to relate to the stability of the polishing performance during long term polishing in the case of the use as a polishing cloth. The Taber-volume loss depends on the types of fluorine type resin to be used, the expansion ratio, the cell density and other factors.

When the Taber-volume loss exceeds 240 mm³, the polishing cloth is easily worn out and clogged, the polishing rate is lowered, and the surface accuracy of the substance to be polished cannot be maintained. As a result, the number of wafers which can be treated with a polishing cloth is lowered. This reduction is considerably disadvantageous in view of productivity and cost. When the Taber-volume loss is less than 25 mm³, the surface of the polishing cloth is hardly renewed and the surface accuracy of the substance to be polished is likely to be damaged. Taking the properties as a polishing cloth into consideration, the Taber-volume loss is preferably between 30 mm³ and 220 mm³, more preferably between 35 mm³ and 200 mm³.

The expanded product of the present invention preferably has a degree of hardness of between 15 and 93, more preferably between 20 and 90, most preferably between 25 and 90. The degree of hardness is influenced by the type of resin, the expansion ratio, the closed cell percentage, the cell density and other factors. In the case of a polishing cloth, the degree of hardness relates to the elastic deformation of the polishing cloth. In order to carry out the polishing under a constant pressure, the degree of hardness is important to uniformly apply a pressure to the finely rugged surface of the substance to be polished. When the degree of hardness exceeds 93, scratches caused by grinding particles are not sufficiently reduced so that the surface of the substance to be polished is disadvantageously scratched during processing. When the degree of hardness is less than 15, the polishing cloth itself deforms considerably so that the flatness of the surface of the substance to be polished is decreased.

An expanded product suitable for a polishing cloth has a Taber-volume loss of between 25 mm³ and 240 mm³ and a degree of hardness of between 15 and 93.

In the case that the expanded product of the present invention is used in the form of a thin tape, there is observed a tendency that the expanded product easily deforms owing to a compressive external force and problems such as changes of thickness are caused when the degree of hardness is less than 15.

The expanded product of the present invention may have an unexpanded layer as the surface layer or the internal layer. When the surface layer is an unexpanded layer, the unexpanded layer is removed when the product is to be used as a polishing cloth. When the expanded product is used in the shape of a tape, the tape often preferably has an unexpanded layer as the surface layer in view of the surface smoothness. The thickness of the unexpanded layer is not particularly limited.

The fluorine type resins used in the present invention include a partially fluorinated resin comprising at least one monomer containing at least one fluorine atom and a perfluoro resin. They include polyvinyl fluoride, polyvinylidene fluoride and polychlorotrifluoroethylene which comprise a single monomer; a copolymerized fluorine type resin comprising at least one monomer selected from the group consisting of vinyl fluoride, vinylidene fluoride, dichlorofluoroethylene, hexafluoropropyrene, perfluorobutadiene, chlorotrifluoroethylene, tetrafluoroethylene, perfluoro-α-olefins such as perfluorobutene-1, perfluoropentene-1 and perfluorohexen-1, perfluoroalkyl perfluorovinyl ethers such as perfluoromethyl perfluorovinyl ether, perfluoroethyl perfluorovinyl ether and perfluoropropyl perfluorovinyl ether, alkyl perfluorovinyl ether having 1 to 6 carbon atoms and aryl perfluorovinyl ether having 6 to 8 carbon atoms; and a copolymerized fluorine type resin obtained from at least one monomer selected from the group consisting of the above listed monomers and at least one monomer selected from the group consisting of vinyl chloride, vinylidene chloride, trichloroethylene, alkyl vinyl ether having 1 to 6 carbon atoms, aryl vinyl ether having 6 to 8 carbon atoms, ethylene, propylene and styrene.

Representative examples of the fluorine type resin to be used in the present invention include polyvinylidene fluoride, polyvinyl fluoride, a copolymer of vinylidene fluoride and tetrafluoroethylene, a copolymer of vinylidene fluoride and hexafluoropropylene, a copolymer of ethylene and tetrafluoroethylene, a copolymer of tetrafluoroethylene and propylene, a copolymer of ethylene and chlorotrifluoroethylene, a copolymer of tetrafluoroethylene and chlorotrifluoroethylene, a copolymer of tetrafluoroethylene and hexafluoropropylene, a copolymer of tetrafluoroethylene and perfluoromethyl perfluorovinyl ether, a copolymer of tetrafluoroethylene and perfluoroethyl perfluorovinyl ether, a copolymer of tetrafluoroethylene and perfluoropropyl perfluorovinyl ether, a copolymer of tetrafluoroethylene, hexafluoropropylene and perfluoromethyl perfluorovinyl ether, a copolymer of tetrafluoroethylene, hexafluoropropylene and perfluoroethyl perfluorovinyl ether, and a copolymer of tetrafluoroethylene, hexafluoropropylene and perfluoropropyl perfluorovinyl ether.

Of these, in view of the adequacy of expansion, economies, availability and the like, polyvinylidene fluoride, polychlorofluoroethylene, a copolymer of vinylidene fluoride and hexafluoropropylene, a copolymer of ethylene and tetrafluoroethylene, a copolymer of ethylene and chlorotrifluoroethylene, a copolymer of tetrafluoroethylene and perfluoroethyl perfluorovinyl ether, a copolymer of tetrafluoroethylene and perfluoropropyl perfluorovinyl ether, and a copolymer of tetrafluoroethylene and hexafluoropropylene are preferable. More preferably, the partially fluorinated resins include polyvinylidene fluoride and a copolymer of vinylidene fluoride and hexafluoropropylene; and the perfluoro resins include copolymers of tetrafluoroethylene and perfluoroalkyl perfluorovinyl ether.

When a fluorine type resin comprising a plurality of monomers is employed in the present invention, the component ratio of monomers is appropriately selected within a large range. Copolymers comprising tetrafluoroethylene and other components have a tendency that the crystallinity of the polymer is reduced according to the decrease in the tetrafluoroethylene content, and that the thermal resistance and chemical resistance are also reduced. In view of physical properties and cost, crystalline resins are preferably employed.

The expanded product of the present invention is adjusted to the appropriate thickness and size depending on the use. The expanded products in the shape of a sheet, a film, a tube, a fiber and the like may be stretched uniaxially or biaxially. The shapes of the cells are different depending on the percentage of stretch. The percentage of stretch is adjusted so that the coefficient of variation, cell density, expansion ratio and closed cell percentage are within the range of the present invention.

The other purpose of the present invention relates to a process for preparing the above expanded fluorine type resin product comprising the steps of adding 0.4 to 20% by weight of a $C_1$ to $C_8$-fluorocarbon having a boiling point lower than the crystalline melting point of the fluorine type resin and 0.01 to 1% by weight of at least one compound selected from water and alcohols having a boiling point of 150° C. or less, and a latent heat of evaporation of 7.0 kcal/mol or more to the above thermoplastic fluorine type resin, and expanding them.

A $C_1$ to $C_8$-fluorocarbon having a boiling point lower than the crystalline melting point of the fluorine type resin is used as a physical blowing agent. Representative examples of the fluorocarbon include hexafluoroethane, pentafluoroethane, tetrafluoroethane, trifluoroethane, difluoroethane, fluoroethane, tetrafluoromethane, trifluoromethane, difluoromethane, fluoromethane, perfluorocyclobutane, hexafluorobutane, perfluoropropane, perfluorobutane, perfluoropentane, perfluorohexane, and perfluoroheptane. They can be used individually or in combination.

These fluorocarbons may be mixed, as main components, with propane, butane, pentane, and a volatile organic compound such as methyl chloride, methylene chloride, ethyl chloride and ethylene chloride for use. The mixing ratio of the mixture and blowing agent is suitably decided in view of safety, economies, availability, and the expanding properties of the fluorine type resins.

The expanded product of the present invention is prepared by using the above physical blowing agents according to the various known methods. For instance, there can be employed an impregnation expanding method comprising placing a resin which is molded in the shape of a sheet, a film, a fiber, a tube, a pipe and the like or a resin which is molded by injection, blowing or compression in a pressure resistant vessel, adding the above-listed blowing agent in the form of a gas or a liquid thereto, and heating the vessel sealed under a pressure to impregnate the blowing agent into the resin for heat expansion; an extrusion expanding method comprising injecting the above blowing agent into a melted resin under pressure from an injector which is set at the exit of the extrusion molding apparatus, and extrusion molding the resin; and the like.

The amount of the physical blowing agent is 0.4 to 20% by weight based on the amount of the fluorine type resin. The amount of the blowing agent is decided within the above range in view of the type of resins and blowing agents to be used, the affinity between the resin and the blowing agent, the expanding method, the expansion ratio, the closed cell percentage, the cell density, the ease for constituting a multilayer structure, the temperature, pressure and time for the introduction of the blowing agent into the fluorine type resin, and the like. When the amount of the blowing agent is less than 0.4% by weight, the expansion ratio cannot be sufficiently enhanced and the cell density is likely to be lowered. When the amount of the blowing agent is more than 20% by weight, the plasticization of the resin is enhanced too much to maintain the viscoelasticity of the resin suitable for expanding. As a result, too much volatilization of the blowing agent causes linking of cells to fail to improve the expansion ratio. Therefore, the amount of the blowing agent is preferably 1 to 15% by weight, more preferably 1 to 10% by weight.

The temperature for introducing the physical blowing agent used in the present invention into the fluorine type resin is appropriately set in view of the expanding method, the type and physical properties of the blowing agents and the fluorine type resin. When the extrusion expanding method is employed, the blowing agent is introduced at a temperature higher than the melting point and lower than the decomposition point of the fluorine type resin under the circumstance that the resin is melted. The fluorine type resins have a relatively high melting point so that the introducing temperature is generally 150° C. or more. When the impregnation expanding method is employed, the temperature for introducing the blowing agent is generally 20° to 300° C. which is lower than the melting point of the fluorine type resins, preferably 25° to 250° C., more preferably 30° to 200° C. since the blowing agent is introduced while maintaining the form of the fluorine type resins. The impregnation period is very important for the impregnation expanding method since it considerably affects the cell density. The impregnation period needs a period of time for achieving an equilibrium pickup at a prescribed impregnation temperature plus at least 5 hours, preferably 7 hours, more preferably 10 hours. When the expansion is carried out before or just after the equilibrium pickup is achieved, the cell density is unpreferably low. The reason is not clear, but it is presumed that the most suitable cell nucleus is formed because of a rearrangement of molecular chains of the resins during a certain period after the equilibrium pickup is achieved.

The above physical blowing agents are used together with at least one compound selected from water and alcohols having a boiling point of 150° C. or less and a latent heat of evaporation of 7.0 kcal/mol or more. By setting the water or the above alcohols within the range described above, the fluorine type resins work very effectively for the formation of a multilayer cellular structure and having a high cell density in spite of water repellency and oil repellency, the biggest characteristics of the fluorine type resins.

Representative examples of the alcohols include methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 2-ethyl-2-butanol, 3-methyl-2-butanol, 2,2-dimethyl-1-propanol, 2-methyl-1-pentanol, 4-methyl-2-pentanol, 2-ethyl-11butanol, pentafluoropropanol, trifluoropropanol, tetrafluoropropanol and the like. Water and the above-listed alcohols (hereinafter, both of them are referred to as "alcohols") may be used in combination in view of the cell density and the ease of formation of the multilayer structure. Of these, water is most preferable because of its marked effect in improving cell density, easy handling and cost.

The alcohols used in the present invention have a boiling point of 150° C. or less and a latent heat of evaporation of 7.0 kcal/mol or more. When the boiling point is more than 150° C., the latent heat of evaporation is less than 7.0 kcal/mol, and the closed cell percentage is likely to be reduced. Further, the cell density reduces, the formation of the multilayer cellular structure becomes difficult, and the uniformity of the distribution of cell diameters tends to be deteriorated because voids easily occur. When the boiling point exceeds 150° C., the smoothness of the surface of the expanded product is easily damaged upon cooling of the expanded resin so that it is difficult to form a multilayer structure. In view of the above-mentioned matters, it is preferred that the boiling point of the alcohols is 110° C. or less and the latent heat of evaporation is 8.0 kcal/mol or more.

The type of "alcohols" and the amount introduced in the fluorine type resins are selected in view of the type of resins and physical blowing agents to be used, the retention properties of the physical blowing agents and "alcohols", the cell density upon expansion, the closed cell percentage, the ease of constituting a multilayer structure, and the like. Essentially, the "alcohols" have low affinity for the fluorine type resins and the physical blowing agents used in the present invention so that the amount of the "alcohols" impregnated into the resins is not large. The suitable amount of the "alcohols" varies depending on the type of the fluorine type resins. The above "alcohols" are used in an amount of 0.01 to 1% by weight based on the amount of the fluorine type resin. When the amount is less than 0.01% by weight, there is a tendency that the cell density is lowered and the formation of the multilayer cellular structure is difficult. When the amount is more than 1% by weight, voids easily occur so that the uniformity of the distribution of the cellular structure is reduced. In view of these points, the amount of the "alcohols" is preferably 0.04 to 0.8% by weight.

FIG. 2 is a graph showing the relation between the water content and cell density of the fluorine type resin. As can be seen from the graph, the cell density sharply changes according to the change of the water content in the fluorine type resin. The graph suggests that, in case that the water concentration distribution appears in the direction of the thickness, the cell density of a layer is decreased to form an interface having a different cell density between the layer and the adjacent layer when the water content of the layer is 400 ppm or less.

For the purpose of obtaining a suitable cell density, an inactive inorganic gas may be added in the fluorine type resin if necessary. Such an inorganic gas includes air, nitrogen, argon, helium, and carbon dioxide.

The "alcohols" to be used in the present invention are used in the form of a gas or a liquid. The "alcohols" are introduced in the fluorine type resin before, after or at the same time as when the physical blowing agent is added to the resin. The impregnation expanding method comprises the steps of preliminarily exposing the fluorine type resin to or immersing the resin in a certain amount of "alcohols" in the form of a gas or a liquid to introduce the "alcohols" into the resin and then impregnating the physical blowing agent in the resin; immersing the fluorine type resin in a physical blowing agent containing a certain amount of "alcohols" to simultaneously introduce the "alcohols" and the blowing agent in the resin; or preliminarily exposing the fluorine type resin containing a physical blowing agent to or immersing the resin in a certain amount of "alcohols" in the form of a gas or a liquid to introduce the "alcohols" in the resin. Of these, the impregnation expanding method wherein the "alcohols" are introduced in the fluorine type resin into which the physical blowing agent is preliminarily introduced, and the impregnation expanding method wherein the physical blowing agents and the "alcohols" are simultaneously introduced in the fluorine type resin are preferred in view of the ease of the introduction of the "alcohols" into the fluorine type resin and simplification of the production steps. According to the extrusion expanding method, the "alcohols" are introduced at the same time when, before or after the physical blowing agent is introduced into the melted fluorine type resin.

The expanded fluorine type resin product of the present invention has a multilayer structure comprising at least two layers having different cell densities. The expanded product is presumably formed by the change in the existence ratio of the "alcohols" in each layer of the resin as explained above. The multilayer structure of the present invention can be formed according to the following process.

According to the impregnation expanding method, the formation of the multilayer structure is controlled mainly by adjusting the period for impregnating "alcohols" to the fluorine type resin. After the "alcohols" reach an equilibrium impregnation amount, the formation is controlled by adjusting the vaporization period of the "alcohols" by exposing the fluorine type resin to the air. The thickness and number of the layers are controlled by changing the temperature during impregnation or vaporization of the "alcohols". The impregnation period and temperature, vaporization period and vaporization temperature for introducing "alcohols" into the fluorine type resin are suitably determined in view of the type and physical properties of the "alcohols" and the resin, and the type and physical properties of the blowing agent. Generally, they are 0° to 300° C. and 1 minute to 72 hours, preferably 5° to 250° C. and 5 minutes to 48 hours, more preferably 5° to 200° C. and 10 minutes to 24 hours. In the extrusion expanding method, two or more extruders are employed. Fluorine type resins in each extruder are laminated before extruding while adjusting the amount of "alcohols" to be fed into each extruder. Then the extruded laminated resin is expanded to obtain an expanded product having the multilayer structure.

In the impregnation expanding method, the temperature and the period for heating the resin containing a physical blowing agent and "alcohols" are likely to depend on each other, and they are suitably selected according to the type of the blowing agent, cell density and hardness of the expanded product, and the closed cell percentage desirable for the expanded product. In general, the heating temperature is higher than the melting point of the resin and lower than the decomposition temperature of the resin. A temperature higher than the melting point by 10° C. is preferred. The heating period is determined according to the heating temperature, preferably 1 to 240 seconds.

When the prescribed expansion ratio is not achieved by the above expansion methods, the physical blowing agent is impregnated into the resultant expanded product to heat expand again. The type and impregnated amount of the blowing agent are decided in view of the expansion ratio, closed cell percentage and cell density of the re-expanded expanded product. The heating temperature and the heating period for re-expansion are selected from the range defined in the above impregnation expanding method.

It is not clear why the "alcohols" are effective to obtain a high expansion ratio, a high closed cell percentage, a high cell density, a uniform distribution of cell diameters, and formation of a multilayer cell structure. It is considered that the "alcohols" work as a type of cell nuclei during expansion and effectively cool and harden the cell walls during expansion because of their large latent heat of evaporation to prevent cells from merging and linking. It is also presumable that the change of existence ratio of the "alcohols" at each layer of the fluorine type resin results in a change of the cell density and average cell diameter at each layer to form a multilayer cellular structure.

The existence of the "alcohols" prevents, to a certain degree, a sudden reduction in melt viscoelasticity around the exposing temperature during expansion, even if the fluorine type resin without a cross-linking structure is used. This probably gives suitable expanding properties to the resin.

Figure 1:
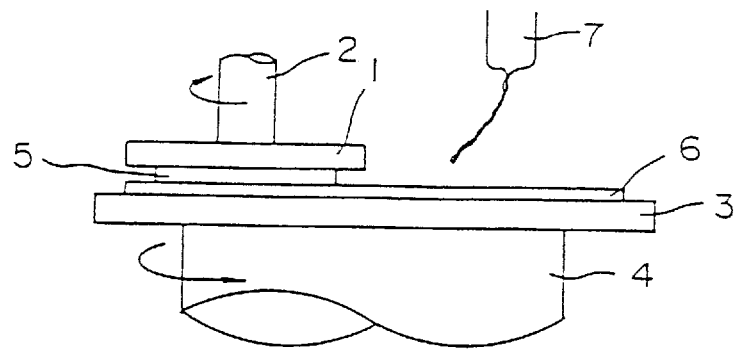
FIG. 1 is a schematic view of a polishing machine.
Figure 2:
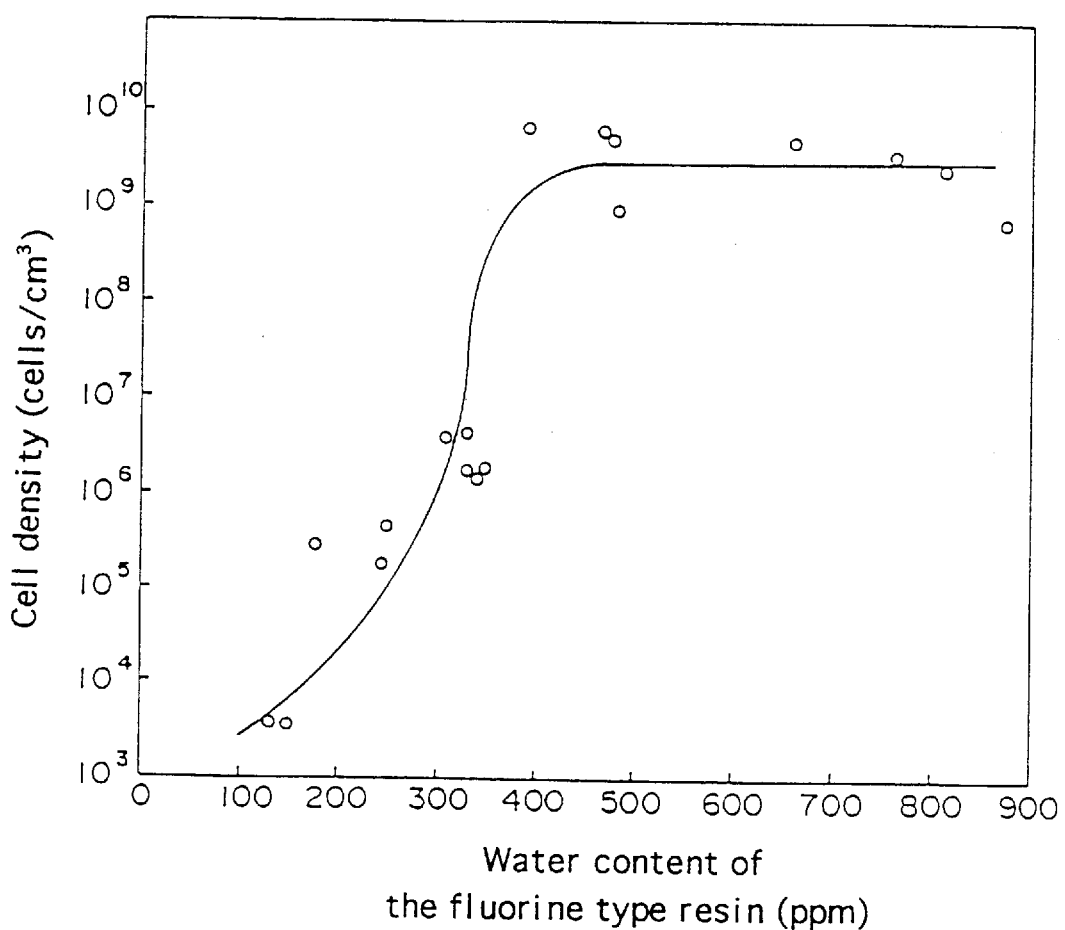
FIG. 2 is a schematic graph showing the relationship between the water content of a vinylidene fluoride-hexafluoropropylene copolymer resin sheet prepared using tetrafluoroethane as a blowing agent and the cell density.

Numerals used in the figures are as follows:
1: Upper plate
2: Rotation axis of upper plate
3: Lower plate
4: Rotation axis of lower plate
5: Wafer
6: Polishing cloth
7: Polishing solution dropping machine

BEST MODE FOR CARRYING OUT THE INVENTION

In the Examples, each measured value is obtained as follows:

(1) Measurement of layer interface

An expanded product is sliced to be around 30 μm thick in the direction of its thickness using a microtome. The sliced piece is observed with a light microscope of 30 magnification to determine shading areas. Relatively, layers having a high cell density are dark and those having a low cell density are light. Then, the thickness of each layer determined to be light or dark within the view of a light microscope is measured.

(2) Distribution index and coefficient of variation

Each layer of an expanded product is sliced at an optional point. A photograph of the cut surface of each resultant piece is taken by a scanning electron microscope with 50 to 150 magnification. The photograph is set on an image processor (Color Image Processor SPICCA-II manufactured by Nippon Avionics Co., Ltd.) at an optional point of the photograph having a field area of view of about 0.04 mm$^2$. The maximum diameter of each open cell is measured by the image processing. $L_{Max.}$, $L_{Min.}$ and $L_{av.}$ of the open cells present in the field of view are calculated to obtain a distribution index and a coefficient of variation.

(3) Cell density

Each layer of an expanded product is sliced at an optional point. A photograph of the cut surface of each resultant piece is taken by a scanning electron microscope with 50 to 150 magnification. A 400μ×400μ field of view is set at an optional point on the photograph to count cell numbers (M) within the view. The cell density (number/cm$^3$) is calculated according to the equation as follows:

$$\text{Cell density} = \{(M)^{1/2} \times 10000/400\}^3 \times \text{expansion ratio}$$

(4) Expansion ratio

The expansion ratio is calculated according to the equation as follows:

$$\text{Expansion ratio} = \text{density of resin (g/cm}^3\text{)/density of expanded product (g/cm}^3\text{)}$$

(5) Closed cell percentage

The closed cell percentage is calculated as the balance with respect to an open cell percentage determined by the air pycnometer method described in ASTM-D2856.

(6) Determination of "alcohols" in resin

The water content is determined according to the Karl Fischer method. The amount of alcohols is determined using gas chromatography after the alcohols are vaporized from the resin.

(7) Degree of hardness

The degree of hardness is measured using an ASKER Type C device manufactured by KOBUNSHI KEIKI CO., LTD. according to a standard, SRIS 0101, of the Society of Rubber Industry, Japan.

(8) Taber-volume loss

According to JIS K7204, an abrasion amount is measured using a test piece having a thickness of about 1 mm under the condition of 1000 g loading and 1000 rpm. The amount is divided with the density of the resin to obtain a Taber-volume loss.

(9) Evaluation of polishing properties

A GaAs single-crystal wafer having a diameter of 50 mm and a thickness of 450μ is wrapped with alumina abrasive particles having an average particle diameter of 5μ for a pre-processing. The wrapped wafer is polished with a polishing machine as shown in FIG. 1. The quality of the polished surface of the wafer is standardized to evaluate polishing properties.

The polishing machine comprises lower and upper plates 1 and 3 which rotate inversely with respect to each other. The above-described GaAs single-crystal wafer 5 and a polishing cloth 6 having a diameter of 300 mm and a thickness of 1.0 mm are set on the plates to polish the wafer under a pressure of 80 g/cm$^2$ at 120 rpm for 1 hour with dropping a 2% Br$_2$ methanol solution, as a polishing solution, from a drip-feeding machine 7 at a rate of 10 cc/min. This operation is repeated to polish two dozen wafers. The surface of the wafer which is polished last is observed under direct vision or with magnification to evaluate its quality. The criterion of the evaluation is as follows:

Excellent surface smoothness, no scratch: ◎

Good surface smoothness, no scratch: ○

Poor surface smoothness, scratched: X

No dullness of edge: ◎

Dullness of edge: X

(10) Dielectric constant

The dielectric constant ($\epsilon_1$) of a specimen of an expanded product is measured at a frequency of 1 MHz using the instrument YHP-4192A (manufactured by Yokogawa-Hewlett-Packard, Ltd.). The dielectric constant ($\epsilon_2$) of the specimen compressed to 50% is measured.

(11) Tear strength

The tear strength is measured according to ASTM D1922 using an Elmendorf tear tester.

(12) Compression test

The relationship between compressive stress and strain is measured using a 2 mm thick specimen with a Shimazu autograph AG-500D. The compressive modulus is measured at a compressive strength at 50% compressive strain and a compressive stress of 200 g/cm$^2$ or less, taking into consideration the loading pressure at the time when the expanded product is used as a polishing cloth.

(13) Evaluation of recyclability of resin

The expanded product is heat melted at a higher temperature than the melting point by 60° to 80° C. to produce a film by pressing. The recyclability is evaluated from melt uniformity and the degree of coloring of the resultant film. The criterion of the evaluation is as follows:

Same melt uniformity as the unexpanded raw sheet and no coloring: ◎

Less melt uniformity than the unexpanded raw sheet and colored: X

(14) Measurement of dielectric strength

The dielectric breakdown voltage of a specimen compressed to 50% is measured while increasing the pressure at a rate of 1 kv/sec. according to ASTM D149. It is expressed in terms of unit thickness.

EXAMPLE 1

A 1.1 mm thick sheet (sheet a) was prepared by hot pressing a vinylidene fluorinated-hexafluoropropylene copolymer resin (density: 1.76 g/cm$^3$; melting point: 150° C.). Sheet a was put in a compressive vessel, then tetrafluoroethane was fed into the vessel under pressure to immerse the sheet in a liquid phase of tetrafluoroethane. The vessel was put into a thermostatic tank at 70° C. and left for 30 hours. The resultant impregnated sheet (sheet b) was taken out from the compressive vessel to measure its weight. When the tetrafluoroethane content and water content were calculated from the weight of the sheet, they were 5.9% by weight and 0.005% by weight, respectively. When sheet b was immersed in hot water at 40° C. for 30 minutes, the tetrafluoroethane content was reduced to 5.6% by weight and the water content was 0.044% by weight. Sheet b was put in a heating oven equipped with a far infrared ray heater at 190° C. for 15 seconds to obtain an expanded sheet.

Each property of the resultant expanded sheet was measured; the results are shown in Table 1. The expanded sheet was sliced in the direction of the thickness to observe the cut surface with a light microscope. The expanded sheet had a three-layer structure, that is, both surface layers of the sheet were dark and the central layer was light. Each of the dark surface layers occupied 20% of the total thickness of the sheet.

The performance of the resultant expanded sheet was evaluated; the results are shown in Table 2. For evaluating the polishing properties, one of the unexpanded surface layers of the sheet was sliced off to use the dark layer as a polishing surface. The dielectric constant was not changed by compression; preferable polishing properties, tear strength, compressive strength and initial modulus were exhibited.

EXAMPLE 2

An expanded sheet was prepared according to the same procedure as in Example 1 except that sheet b was immersed in warm water at 40° C. for 1 hour to obtain an impregnated sheet having a tetrafluoroethane content of 5.4% by weight and a water content of 0.053% by weight.

Each property of the resultant sheet was measured; the results are shown in Table 1. The expanded sheet had a three-layer structure of dark surface layers and a light central layer. The central layer of the sheet was darker than that of the expanded sheet of Example 1. Each of the dark surface layers occupied 30% of the total thickness of the sheet.

The performance of the expanded sheet was evaluated; the results are shown in Table 2. The polishing properties were evaluated according to the same manner as in Example 1.

EXAMPLE 3

Water was fed in a compressive vessel; sheet a of Example 1 was hung in the vessel so as not to dip in the water; Tetrafluoroethane gas was charged into the vessel under a pressure of 18 kg/cm$^2$. The compressive vessel was put in a thermostatic tank at 80° C. and left for 24 hours. The resultant impregnated sheet had a tetrafluoroethane content and a water content of 4.8% by weight and 0.17% by weight, respectively. An expanded sheet was obtained according to the same procedure as in Example 1.

Each property of the resultant expanded sheet was measured; the results are shown in Table 1. The expanded sheet had a three-layer structure of light surface layers and a dark central layer. Each of the light surface layers occupied 20% of the total thickness of the sheet.

The performance of the resultant expanded sheet was evaluated; the results are shown in Table 2. For evaluating the polishing properties, one of the light surface layers of the sheet was sliced off to use the dark layer as a polishing surface. The resultant sheet had an excellent tear strength.

EXAMPLE 4

An expanded sheet was prepared according to the same procedure as in Example 3 except that tetrafluoroethane was charged under a pressure of 13 kg/cm² to obtain an impregnated sheet having a tetrafluoroethane content and a water content of 2.9% by weight and 0.17% by weight, respectively.

Each property of the resultant expanded sheet was measured; the results are shown in Table 1. The expanded sheet had a three-layer structure of light surface layers and a dark central layer. Each of the light surface layers occupied 30% of the total thickness of the sheet.

The performance of the resultant expanded sheet was evaluated; the results are shown in Table 2. The polishing properties were evaluated according to the same manner as in Example 3. The expanded sheet exhibited an excellent dynamic tear strength property, and excellent initial elastic modulus and compressive strength.

EXAMPLE 5

An expanded sheet was prepared according to the same procedure as in Example 3 except that tetrafluoroethane was charged under a pressure of 6 kg/cm² to obtain an impregnated sheet having a tetrafluoroethane content and a water content of 1.3% by weight and 0.16% by weight, respectively.

Each property of the resultant expanded sheet was measured; the results are shown in Table 1. The expanded sheet had a three-layer structure of light surface layers and a dark central layer. Each of the light surface layers occupied 30% of the total thickness of the sheet.

The performance of the resultant expanded sheet was evaluated; the results are shown in Table 2. The polishing properties were evaluated according to the same manner as in Example 3.

EXAMPLE 6

An expanded sheet was prepared according to the same procedure as in Example 1 except that tetrafluoroethane saturated with water was employed and the compressive vessel was left in the thermostatic tank at 100° C. for 24 hours to obtain an impregnated sheet having a tetrafluoroethane content and a water content of 10.7% by weight and 0.17% by weight, respectively.

Each property of the resultant expanded sheet was measured; the results are shown in Table 1. The expanded sheet had a three-layer structure of light surface layers and a dark central layer. Each of the light surface layers occupied 25% of the total thickness of the sheet.

The performance of the resultant expanded sheet was evaluated; the results are shown in Table 2. The polishing properties were evaluated according to the same manner as in Example 3.

COMPARATIVE EXAMPLE 1

The same procedure as in Example 3 was repeated except that water was not fed into the compressive vessel to obtain an impregnated sheet having a tetrafluoroethane content and water content of 4.8% by weight and 0.005% by weight, respectively. An expanded sheet was prepared according to the same procedure as in Example 1.

Each property of the resultant expanded sheet was measured; the results are shown in Table 1. No light or dark layer was observed; the expanded sheet comprised a single layer.

The performance of the resultant expanded sheet was evaluated; the results are shown in Table 2. For evaluating the polishing properties, one of the unexpanded surface layers was removed to use the expanded layer as a polishing surface.

COMPARATIVE EXAMPLE 2

An expanded sheet was prepared according to the same procedure as in Example 3 except that tetrafluoroethane was charged into the vessel under a pressure of 2 kg/cm² to obtain an impregnated sheet having a tetrafluoroethane content of 0.3% by weight and a water content of 0.16% by weight.

Each property of the resultant expanded sheet was measured; the results are shown in Table 1. The expanded sheet had a three-layer structure of light surface layers and a dark central layer. Each of the light surface layers occupied 15% of the total thickness of the sheet.

The performance of the resultant expanded sheet was evaluated; the results are shown in Table 2. The polishing properties were evaluated according to the same manner as in Example 3. As a result, the dielectric constant was not under the dielectric constant expected for a fluorine type resin (2.1 or less).

COMPARATIVE EXAMPLE 3

An impregnated sheet having a tetrafluoroethane content of 20.4% by weight and a water content of 0.17% by weight was prepared with tetrafluoroethane saturated with water by leaving the compressive vessel at 105° C. for 70 hours. An expanded sheet was prepared according to the same procedure as in Example 1 except that the above impregnated sheet was employed.

Each property of the resultant expanded sheet was measured; the results are shown in Table 1. The expanded sheet had a three-layer structure of light surface layers and a dark central layer. Each of the light surface layers occupied 25% of the total thickness of the sheet.

The performance of the resultant expanded sheet was evaluated; the results are shown in Table 2. The polishing properties were evaluated according to the same manner as in Example 3. As the result, the dielectric constant was considerably changed by compression.

COMPARATIVE EXAMPLE 4

An impregnated sheet having a dichlorodifluoromethane content of 4.2% by weight and a water content of 0.005% by weight was prepared by putting sheet a obtained in Example 1 in a compressive vessel and charging dichlorodifluoromethane to impregnate it at 75° C. for 100 hours. An expanded sheet was prepared according to the same procedure as in Example 1 except that the above-obtained impregnated sheet was employed.

Each property of the resultant expanded sheet is shown in Table 1. No light or dark layer was observed in the expanded sheet. The sheet comprised a single layer.

The performance of the resultant sheet was evaluated; the results are shown in Table 2. For evaluating polishing properties, one of the unexpanded layers were removed to use the expanded layer as a polishing surface.

COMPARATIVE EXAMPLE 5

Both surfaces of sheet a of Example 1 were exposed to an electron beam corresponding to an absorbed dose of 20 Mrad with a 500 kV electron beam irradiator. An acid gas was generated from the sheet. The exposed sheet was immersed in dichlorodifluoromethane in a compressive vessel, left at 75° C. for 100 hours and taken out from the vessel. The dichlorodifluoromethane content in the sheet was 4.0% by weight, and the water content in the sheet was 0.005% by weight. An expanded sheet was obtained according to the same procedure as in Example 1 after the impregnated sheet was left at 25° C. in a thermostatic chamber having a relative humidity of 95% for 5 hours.

Each property of the resultant expanded sheet was measured; the results are shown in Table 1. The expanded sheet had a three-layer structure of dark surface layers and a light central layer. Each of the dark surface layers occupied 17% of the total thickness of the sheet.

The performance of the resultant expanded sheet was evaluated; the results are shown in Table 2. The polishing properties were evaluated according to the same manner as in Example 1.

EXAMPLE 7

A 0.2 mm thick sheet was prepared by hot pressing the vinylidene fluorinated-hexafluoropropylene copolymer resin used in Example 1. The sheet was put in a compressive vessel to impregnate tetrafluoroethane as well as in Example 1, and then was immersed in water at 0° C. for 10 hours. The tetrafluoroethane content and water content of the sheet was 4.6% by weight and 0.06% by weight, respectively. The sheet was expanded according to the same manner as in Example 1.

Each property of the expanded sheet was measured; the results are shown in Table 1. The expanded sheet had a three-layer structure of dark surface layers and a light central layer. Each of the dark surface layers occupied 30% of the total thickness of the sheet.

The performance of the resultant expanded sheet was evaluated; the results are shown in Table 2.

EXAMPLE 8

An expanded sheet was prepared according to the same procedure as in Example 3 except that the 0.2 mm thick sheet of Example 7 was employed. Before being expanded, the sheet had a tetrafluoroethane content and a water content of 4.5% by weight and 0.16% by weight, respectively.

Each property of the expanded sheet was measured; the results are shown in Table 1. The expanded sheet had a three-layer structure of light surface layers and a dark central layer. Each of the light surface layers occupied 26% of the total thickness of the sheet.

The performance of the resultant expanded sheet was evaluated; the results are shown in Table 2.

EXAMPLE 9

The impregnation and expansion were carried out according to the same procedure as in Example 3 except that the 0.2 mm thick sheet of Example 7 was employed instead of sheet a and methanol was charged in the compressive vessel instead of water. Before being expanded, the sheet had a tetrafluoroethane content and a methanol content of 4.5% by weight and 0.06% by weight, respectively.

Each property of the expanded sheet was measured; the results are shown in Table 1. The expanded sheet had a three-layer structure of light surface layers and a dark central layer. Each of the light surface layers occupied 12% of the total thickness of the sheet.

The performance of the resultant expanded sheet was evaluated; the results are shown in Table 2.

COMPARATIVE EXAMPLE 6

The 0.2 mm thick sheet used in Example 7 was put in a compressive vessel to immerse it in tetrafluoroethane containing 1-hexanol and was left at 70° C. for 30 hours. The resultant impregnated sheet had a tetrafluoroethane content and a 1-hexanol content of 5.5% by weight and 0.015% by weight, respectively. An expanded sheet was prepared according to the same procedure as in Example 1.

Each property of the expanded sheet was measured; the results are shown in Table 1. No light or dark layer was observed. The expanded layer comprised a single layer.

The performance of the resultant expanded sheet was evaluated; the results are shown in Table 2. As the result, the dielectric constant was considerably changed by compression.

EXAMPLE 10

A 1 mm thick sheet (sheet c) was prepared by hot pressing a copolymer of tetrafluoroethylene and perfluoropropyl perfluorovinyl ether (density: 2.15 g/cm$^3$; melting point: 308° C.). Sheet c was put in a compressive vessel to immerse it in perfluoropentane containing water. The compressive vessel was left in a thermostatic tank at 80° C. for 45 hours. The resultant impregnated sheet (sheet d) was taken out from the vessel and weighed for calculation of the perfluoropentane content and water content. They are 7.0% by weight and 0.035% by weight, respectively. Sheet d was left in a heating oven equipped with a far infrared heater at 400° C. for 35 seconds to obtain an expanded sheet.

Each property of the expanded sheet was measured; the results are shown in Table 1. The expanded sheet had a three-layer structure of light surface layers and a dark central layer. Each of the light surface layers occupied 22% of the total thickness of the sheet.

The performance of the resultant expanded sheet was evaluated; the results are shown in Table 2. For evaluating polishing properties, one of the light surface layers was sliced off to use the exposed dark layer as a polishing surface.

EXAMPLE 11

Sheet c of Example 10 was immersed in perfluorohexane containing pentafluoropropanol in a compressive vessel. The vessel was left in a thermostatic tank at 80° C. for 35 hours. The perfluorohexane content and the pentafluoropropanol content were 5.7% by weight and 0.018% by weight, respectively. An expanded sheet was obtained according to the same procedure as in Example 10.

Each property of the expanded sheet was measured; the results are shown in Table 1. The expanded sheet had a three-layer structure of light surface layers and a dark central layer. Each of the light surface layers occupied 35% of the total thickness of the sheet.

The performance of the resultant expanded sheet was evaluated; the results are shown in Table 2. The polishing properties were evaluated according to the same manner as in Example 10.

EXAMPLE 12

A 0.2 mm thick sheet was prepared using the copolymer resin of tetrafluoroethylene and perfluoropropyl perfluorovinyl ether used in Example 10. The sheet was put in a compressive vessel to immerse it in perfluorohexane containing water and left at 70° C. for 50 hours. The resultant impregnated sheet had a perfluorohexane content and a water content of 7.2% by weight and 0.015% by weight, respectively. An expanded sheet was obtained using the impregnated sheet according to the same procedure as in Example 10.

Each property of the expanded sheet was measured; the results are shown in Table 1. The expanded sheet had a three-layer structure of light surface layers and a dark central layer. Each of the light surface layers occupied 10% of the total thickness of the sheet.

The performance of the resultant expanded sheet was evaluated; the results are shown in Table 2.

EXAMPLE 13

The sheet of Example 12 was immersed in tetrafluoroethane containing saturated water at 75° C. for 40 hours. The immersed sheet was put in another compressive vessel and left at 10° C. under a nitrogen gas pressure of 10 kg/cm$^2$ for 30 hours. The obtained impregnated sheet had a tetrafluoroethane content and a water content of 2.4% by weight and 0.02% by weight, respectively. An expanded sheet was prepared using the impregnated sheet according to the same procedure as in Example 10.

Each property of the expanded sheet was measured; the results are shown in Table 1. The expanded sheet had a three-layer structure of light surface layers and a dark central layer. Each of the light surface layers occupied 13% of the total thickness of the sheet.

The performance of the resultant expanded sheet was evaluated; the results are shown in Table 2.

INDUSTRIAL APPLICABILITY

The expanded fluorine type resin product of the present invention has a specific expansion ratio, a specific closed cell percentage, and a multilayer structure comprising layers having different cell densities. Each layer of the expanded product has very uniform maximum open cell diameters at an optional cut surface so that the expanded product causes no dullness of edges, exhibits stable polishing performance for a long time, and has excellent mechanical strength such as tear strength and compressive strength, constant dielectric constant before and after the compression of the expanded product, and an excellent voltage resistance. Accordingly, the expanded product is advantageously used in various ways such as a polishing cloth for electronic materials like a silicon single-crystal wafer, a compound semiconductor wafer, a glass substrate for a liquid crystal display and a color filter for a liquid crystal display, a soft gasket, an electric insulating tape, a coating material for wires, fabric for tents, roofing for membrane structures and a thermal insulating tube.

When the expanded fluorine type resin product of the present invention is used as a polishing cloth, dullness of edges, which occurs as a result of precise polishing of a wafer and the like, is avoided by using a layer having a relatively high cell density as a polishing surface. Moreover, polishing with the layer having a high cell density scarcely causes processing defects such as scratches, and it works as well as a composite material comprising materials having low elastic deformation and high elastic deformation.

Despite the fact that the expanded fluorine type resin product of the present invention has a high cell density, the initial elastic modulus at a load range of about 50 to 200 g/m$^2$, which is applied to a precise polishing of a wafer, and tear strength is likely to be improved due to the multilayer cellular structure.

Particularly, when an expanded product having specific Taber-volume loss and hardness is used as a cloth for a precise polishing of a wafer and the like, it does not cause dullness of the edges and exhibits constant polishing performance for a long time.

Moreover, the expanded product of the present invention has no cross-linking structure. Therefore, it can be melt processed again. The resin can be recycled during the processing steps and recycled to a crude material resin for a product.

According to the present invention, an expanded fluorine type resin product having the above-mentioned excellent properties can be effectively and reliably produced.

TABLE 1

| Example No. | Expansion ratio | Closed cell percentage (%) | Layer structure | Layer A Distribution index | Cv | Cell density (no./cm$^3$) | Layer B Distribution index | Cv | Cell density (no./cm$^3$) | Taber-volume loss (mm$^3$) | Hardness |
|---|---|---|---|---|---|---|---|---|---|---|---|
| Ex. 1 | 14 | 95 | A/B/A | 5.1 | 0.68 | $3 \times 10^9$ | 5.8 | 0.75 | $6 \times 10^6$ | 88 | 67 |
| Ex. 2 | 14 | 96 | A/B/A | 4.9 | 0.60 | $5 \times 10^9$ | 5.2 | 0.70 | $6 \times 10^6$ | 87 | 67 |
| Ex. 3 | 12.5 | 98 | A/B/A | 5.7 | 0.80 | $4 \times 10^6$ | 3.0 | 0.81 | $4 \times 10^9$ | 79 | 72 |
| Ex. 4 | 8 | 95 | A/B/A | 5.5 | 0.71 | $2 \times 10^6$ | 2.8 | 0.75 | $3 \times 10^9$ | 50 | 82 |
| Ex. 5 | 4 | 93 | A/B/A | 4.9 | 0.75 | $7 \times 10^6$ | 2.7 | 0.65 | $5 \times 10^6$ | 25 | 92 |
| Ex. 6 | 30 | 85 | A/B/A | 5.6 | 0.85 | $6 \times 10^6$ | 5.6 | 0.72 | $9 \times 10^6$ | 190 | 33 |
| Comp. Ex. 1 | 12 | 98 | A | 7.8 | 2.4 | $3 \times 10^6$ | — | — | — | 76 | 73 |
| Comp. Ex. 2 | 2.5 | 90 | A/B/A | 7.2 | 1.3 | $5 \times 10^4$ | 5.7 | 1.6 | $6 \times 10^6$ | 15 | 95 |
| Comp. Ex. 3 | 3.0 | 35 | A/B/A | 6.1 | 0.90 | $3 \times 10^4$ | 6.5 | 1.2 | $8 \times 10^6$ | 18 | 95 |
| Comp. Ex. 4 | 5 | 90 | A | 5.9 | 0.95 | $2 \times 10^8$ | — | — | — | 31 | 90 |
| Comp. Ex. 5 | 8 | 66 | A/B/A | 7.8 | 2.4 | $4 \times 10^5$ | 8.3 | 2.6 | $6 \times 10^4$ | 50 | 84 |
| Ex. 7 | 7 | 95 | A/B/A | 5.2 | 0.70 | $8 \times 10^6$ | 5.6 | 0.73 | $7 \times 10^7$ | — | 85 |
| Ex. 8 | 6 | 96 | A/B/A | 3.4 | 0.71 | $6 \times 10^7$ | 3.1 | 0.77 | $8 \times 10^6$ | — | 87 |
| Ex. 9 | 6 | 90 | A/B/A | 5.6 | 0.73 | $5 \times 10^6$ | 4.1 | 0.55 | $6 \times 10^6$ | — | 87 |
| Comp. Ex. 6 | 13 | 38 | A | 6.2 | 1.1 | $5 \times 10^5$ | — | — | — | — | 70 |
| Ex. 10 | 6.7 | 75 | A/B/A | 3.4 | 0.58 | $8 \times 10^7$ | 4.8 | 0.52 | $9 \times 10^6$ | 52 | 75 |
| Ex. 11 | 6.1 | 70 | A/B/A | 5.7 | 0.81 | $9 \times 10^6$ | 5.0 | 0.63 | $7 \times 10^6$ | 47 | 76 |
| Ex. 12 | 18 | 80 | A/B/A | 5.i | 0.70 | $8 \times 10^6$ | 4.2 | 0.51 | $3 \times 10^9$ | — | 35 |
| Ex. 13 | 5.1 | 92 | A/B/A | 4.2 | 0.50 | $6 \times 10^7$ | 2.8 | 0.60 | $5 \times 10^9$ | — | 82 |

TABLE 2

| Example No. | Evaluation for polishing Scratch | Evaluation for polishing Dullness of edge | Dielectric constant Before compression ($\epsilon_1$) | Dielectric constant After compression ($\epsilon_2$) | Tear strength (g/mm) | Compressive strength (kg/cm$^2$) | Initial elastic modulus (kg/cm$^2$) | Voltage resistance (kv/mm) | Recyclability |
|---|---|---|---|---|---|---|---|---|---|
| Ex. 1 | ◉ | ◉ | 1.2 | 1.2 | 365 | 6.5 | 19 | — | ◉ |
| Ex. 2 | ◉ | ◉ | 1.2 | 1.2 | 370 | 6.5 | 19 | — | ◉ |
| Ex. 3 | ◉ | ◉ | 1.2 | 1.2 | 370 | 7.0 | 22 | — | ◉ |
| Ex. 4 | ◉ | ◉ | 1.3 | 1.3 | 390 | 11.3 | 36 | — | ◉ |
| Ex. 5 | ◉ | ◉ | 1.8 | 1.8 | 420 | 24.0 | 78 | — | ◉ |
| Ex. 6 | ○ | ◉ | 1.1 | 1.2 | 330 | 3.0 | 9 | — | ◉ |
| Comp. Ex. 1 | X | X | 1.2 | 1.4 | 280 | 6.0 | 15 | — | ◉ |
| Comp. Ex. 2 | X | X | 2.7 | 3.0 | 330 | 30.0 | 80 | — | ◉ |
| Comp. Ex. 3 | X | X | 2.2 | 3.8 | 320 | 25.0 | 65 | — | ◉ |
| Comp. Ex. 4 | ○ | X | 1.6 | 1.6 | 350 | 10.1 | 29 | — | ◉ |
| Comp. Ex. 5 | X | X | 1.3 | 1.4 | 300 | 9.5 | 22 | — | X |
| Ex. 7 | — | — | 1.4 | 1.4 | 390 | 15.5 | 43 | 20 or more | ◉ |
| Ex. 8 | — | — | 1.5 | 1.5 | 410 | 17.0 | 50 | 20 or more | ◉ |
| Ex. 9 | — | — | 1.5 | 1.5 | 400 | 18.0 | 51 | 20 or more | ◉ |
| Comp. Ex. 6 | — | — | 1.2 | 2.8 | 260 | 5.7 | 14 | 6 | ◉ |
| Ex. 10 | ◉ | ◉ | 1.1 | 1.2 | 360 | 9.0 | 28 | — | ◉ |
| Ex. 11 | ◉ | ◉ | 1.1 | 1.2 | 380 | 10.5 | 31 | — | ◉ |
| Ex. 12 | — | — | 1.1 | 1.1 | 330 | 3.5 | 10 | 20 or more | ◉ |
| Ex. 13 | — | — | 1.2 | 1.2 | 380 | 12.0 | 36 | 20 or more | ◉ |

What is claimed is:

1. An expanded product comprising a thermoplastic fluorine resin which does not have a cross-linking structure and has an expansion ratio of between 4-fold and 30-fold and a closed cell percentage of 40% or more, the expanded product which contains at least one interface comprising layers adjacent to each other having different cell densities and which has a distribution index (Sc) and a coefficient of variation (Cv) of the maximum diameter of an open cell present at an optional cross section of each layer of 0<Sc≦6 and 0<Cv≦1, respectively, which are represented by equations as follows:

$$Sc = (L_{Max.} - L_{Min.})/L_{av.} \quad (1)$$

$$Cv = SD/L_{av.} \quad (2)$$

wherein $L_{Max.}$, $L_{Min.}$ and $L_{av.}$ represent maximum, minimum and average values of maximum diameters of open cells, respectively and SD represents a standard deviation.

2. The expanded fluorine resin product according to claim 1, wherein the cell density of each layer is at least $10^6$ per Cm$^3$.

3. The expanded fluorine resin product according to claim 1, wherein the ratio of the cell densities of each layer is between 5 and $10^5$.

4. The expanded fluorine resin product according to claim 1, wherein the surface layers of the product are unexpanded layers.

5. The expanded fluorine resin product according to claim 1, wherein the expanded product has a Taber-volume loss of between 25 mm$^3$ and 240 mm$^3$.

6. The expanded fluorine resin product according to claim 1, wherein the expanded product has a degree of hardness of between 15 and 93.

7. The expanded fluorine resin product according to claim 1, wherein the ratio of the cell densities of each layer is between 10 to $10^4$.

8. The expanded fluorine resin product according to claim 1, wherein said thermoplastic fluorine resin is selected from the group consisting of polyvinylidene fluoride, polyvinyl fluoride, copolymers of vinylidene fluoride and tetrafluoroethylene, copolymers of vinylidene fluoride and hexafluoropropylene, copolymers of ethylene and tetrafluroethylene, copolymers of tetrafluoroethylene and propylene, copolymers of ethylene and chlorotrifluoroethylene, copolymers of tetrafluoroethylene and chlorotrifluoroethylene, copolymers of tetrafluoroethylene and hexafluoropropylene, copolymers of tetrafluoroethylene and perfluoromethyl perfluorovinyl ether, copolymers of tetrafluoroethylene and perfluoroethyl perfluorovinyl ether, copolymers of tetrafluoroethylene and perfluoropropyl perfluorovinyl ether, copolymers of tetrafluroethylene, hexafluoropropylene and perfluoromethyl perfluorovinyl ether, copolymers of tetrafluoroethylene, hexafluoropropylene and perfluoroethyl perfluorovinyl ether, and copolymers of tetrafluoroethylene, hexafluoropropylene and perfluoropropyl perfluorvinyl ether.

9. The expanded fluorine resin product according to claim 1, wherein said product contains 2 to 7 layers.

10. The expanded fluorine resin product according to claim 1, wherein said closed cell percentage is at least 60%.

11. A process for preparing an expanded fluorine resin product comprising the steps of adding, to a thermoplastic fluorine resin without a cross-linking structure, 0.4 to 20% by weight of a $C_1$ to $C_8$-fluorocarbon having a boiling point lower than the crystalline melting point of the resin and 0.01 to 1% by weight of at least one compound selected from the group consisting of water and alcohols having a boiling point of 150° C. or less and a latent heat of evaporation of 7.0 kcal/mol or more, and expanding the mixed resin.

12. The process for preparing an expanded fluorine resin product according to claim 11, wherein 1 to 15% by weight of the fluorocarbon is added to the resin.

13. The process for preparing an expanded fluorine resin product according to claim 11, wherein at least one compound selected from the group consisting of water and alcohols having a boiling point of 110° C. or less and a latent heat of evaporation of 8.0 kcal/mol is added to the resin.

14. The process for preparing an expanded fluorine resin product according to claim 11, wherein 0.04 to 0.8% by weight of water is added to the resin.

15. The process for preparing an expanded fluorine resin product according to claim 11, wherein said one compound is an alcohol selected from the group consisting of methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 2-ethyl-2-butanol, 3-methyl-2-butanol, 2,2-dimethyl-1-propanol, 2-methyl-1-pentanol, 4-methyl-2-pentanol, 2-ethyl-1-butanol, pentafluoropropanol, trifluoropropanol, and tetrafluoropropanol.

16. The process for preparing an expanded fluorine resin product according to claim 11, wherein a concentration distribution of at least one compound selected from the group consisting of water and alcohols exists in the direction of thickness of the resin.

17. The process for preparing an expanded fluorine resin product according to claim 11, wherein the formation of the multilayer structure is controlled by adjusting the period for impregnating at least one compound selected from the group consisting of water and alcohols to the fluorine resin, or by adjusting the vaporization period of said compound by exposing the fluorine resin to the air after said compound reaches an equilibrium impregnation amount.

18. An expanded product produced by a process for preparing an expanded fluorine resin product comprising the steps of adding, to a thermoplastic fluorine resin without a cross-linking structure, 0.4 to 20% by weight of a $C_1$ to $C_8$-fluorocarbon having a boiling point lower than the crystalline melting point of the resin and 0.01 to 1% by weight of at least one compound selected from the group consisting of water and alcohols having a boiling point of 150° C. or less and a latent heat of evaporation of 7.0 kcal/mol or more, and expanding the mixed resin;

wherein said expanded product has an expansion ratio of between 4-fold and 30-fold and a closed cell percentage of 40% or more, the expanded product which contains at least one interface comprising layers adjacent to each other having different cell densities and which has a distribution index (Sc) and a coefficient of variation (Cv) of the maximum diameter of an open cell present at an optional cross section of each layer of $0 < Sc \leq 6$ and $0 < Cv \leq 1$, respectively, which are represented by equations as follows:

$$Sc = (L_{Max.} - L_{Min.})/L_{av.} \qquad (1)$$

$$Cv = SD/L_{av.} \qquad (2)$$

wherein $L_{Max.}$, $L_{Min.}$ and $L_{av.}$ represent maximum, minimum and average values of maximum diameters of open cells, respectively; and SD represents a standard deviation.

* * * * *